United States Patent [19]

Villagomez

[11] Patent Number: 4,906,367

[45] Date of Patent: Mar. 6, 1990

[54] LINT STRAINER FOR WASHING MACHINE DRAINS

[76] Inventor: Timothy A. Villagomez, 129 E. Florence, La Habra, Calif. 90631

[21] Appl. No.: 329,355

[22] Filed: Mar. 27, 1989

[51] Int. Cl.⁴ .............................................. B01D 35/02
[52] U.S. Cl. .................................... 210/251; 210/499; 210/452; 210/460; 134/153; 68/18 F; 68/18 FA
[58] Field of Search ............... 210/251, 449, 452, 460, 210/474, 477, 482, 497.3, 487; 68/18 F, 18 FA; 134/153; 209/288

[56] References Cited

U.S. PATENT DOCUMENTS

| | | | |
|---|---|---|---|
| 3,638,799 | 2/1972 | Serowiecki | 210/474 |
| 3,959,138 | 5/1976 | Nichols | 210/460 |
| 3,960,733 | 6/1976 | Van Dieren | 210/460 |
| 3,984,330 | 10/1976 | Nichols | 210/449 |
| 4,217,667 | 8/1980 | Whitehouse | 210/482 |
| 4,287,067 | 9/1981 | Dyner | 210/487 |
| 4,566,970 | 1/1986 | Piai et al. | 210/460 |

Primary Examiner—Peter Hruskoci
Assistant Examiner—Wanda L. Millard
Attorney, Agent, or Firm—Edgar W. Averill, Jr.

[57] ABSTRACT

A lint strainer for removing the lint from the exit hose of a washing machine before the lint can enter the drain of the residence or other structure in which the washing machine is located. The lint strainer has a flexible fabric mesh strainer tube having an open end and a closed end. A polymeric ring is affixed to the open end, and the polymeric ring is larger than the opening of the drain pipe which conducts the waste away from the washing machine.

5 Claims, 1 Drawing Sheet

U.S. Patent
Mar. 6, 1990
4,906,367
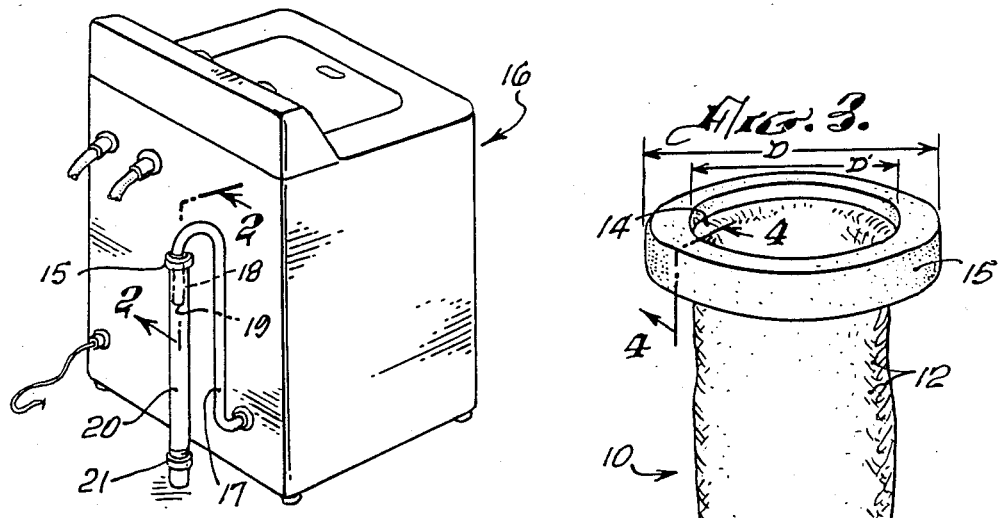
Fig. 1.
Fig. 3.
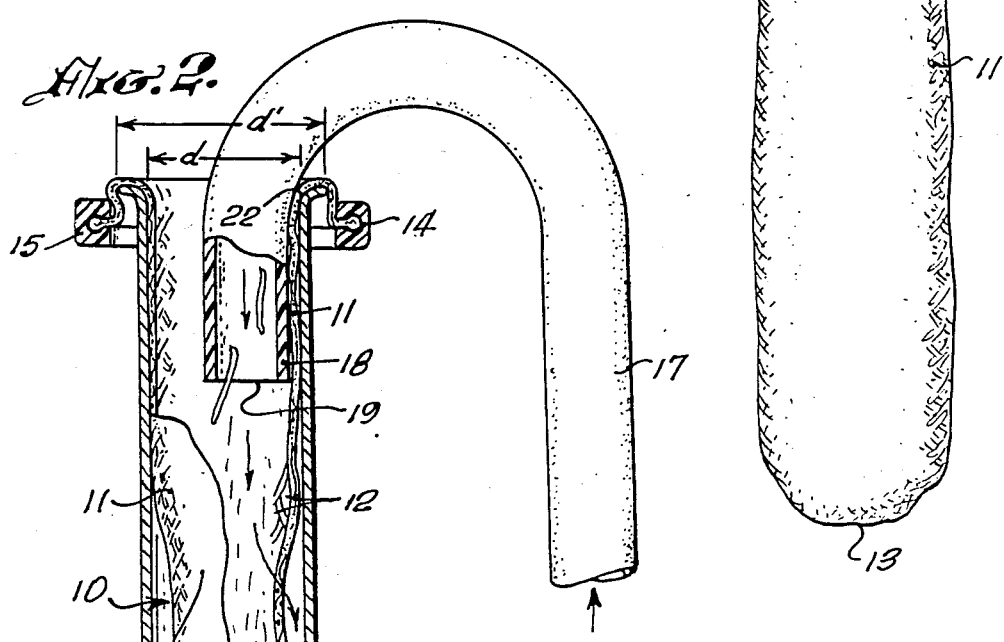
Fig. 2.
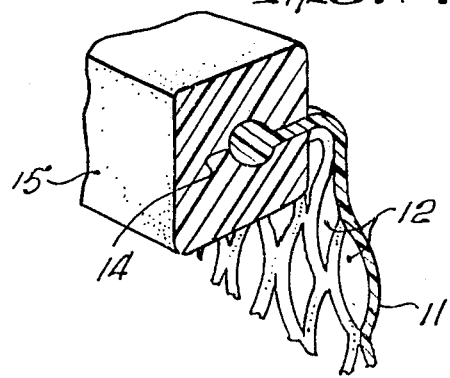
Fig. 4.

LINT STRAINER FOR WASHING MACHINE DRAINS

BACKGROUND OF THE INVENTION

The field of the invention is plumbing accessories, and the invention relates more particularly to strainers to prevent undesirable objects from entering a drain.

Most modern washing machines agitate the objects being washed to an extent sufficiently so that some lint, and often a substantial amount of lint, passes out of the washing machine through its drain hose. Most washing machine drain hoses exit directly into a drain pipe and any such lint passes into the drain pipe. Not uncommonly, such lint will plug the drain pipe, and the result is an overflow of the drain pipe and a substantial mess and possible damage to the area surrounding the washing machine.

SUMMARY OF THE INVENTION

It is an object of the invention to provide a strainer for washing machine exit hoses, which strainer is easily cleaned and of a universal type nature to fit a wide range of drain pipe sizes.

The present invention is for a lint strainer for washing machines for preventing lint in the exit water stream of the washing machine from entering the drain line. The washing machine with which the lint strainer is used is of the type which includes a rubber drain hose having an inverted U-shaped exit end which is inserted into a generally vertical drain pipe. Such combinations are widely used and have the advantage of being antisiphoning and also requiring no skill to attach. The strainer has a flexible, closed, tubular strainer member having a top and a bottom and a plurality of openings thereto. The strainer member has an open top and a closed bottom. A ring member has an inside diameter larger than the generally circular opening at the top of the drain pipe. The strainer is inserted over the rubber drain hose which is inserted into the open end of the drain pipe. The ring member prevents the lint strainer from fully entering the drain hose and extends over the top of the drain pipe. The ring member is preferably molded about the top of the strainer, and the strainer is preferably fabricated from a polymer mesh having relatively large openings so that the strainer is not rapidly plugged by small lint particles since such particles will cause no problems with the drain system.

BRIEF DESCRIPTION OF THE DRAWINGS

FIG. 1 is a perspective view of a washing machine including a rubber drain hose inserted into a generally vertical drain pipe having the lint strainer of the present invention placed in the opening of the drain pipe.

FIG. 2 is an enlarged cross-sectional view of the lint strainer of the present invention taken along line 2—2 of FIG. 1.

FIG. 3 is an enlarged perspective view of the lint strainer of the present invention.

FIG. 4 is a cross-sectional view of the ring member of the lint strainer of FIG. 3.

DESCRIPTION OF THE PREFERRED EMBODIMENTS

The lint strainer of the present invention is shown in perspective view in FIG. 3 and indicated by reference character 10. Lint strainer 10 has a flexible, closed tubular strainer member 11, preferably fabricated from a durable mesh made from a man made fiber such as nylon. Strainer member 11 has openings 12, shown best in FIG. 4, and such openings should be large enough to readily permit small pieces of lint to pass through. Such small pieces of lint cause no blockage of a drain system and would decrease the time interval between cleaning of the strainer. It has been found that openings which permit a spherical object having a diameter up to about 1/32 of an inch to pass through is practical and preferable.

It can be seen that the strainer member 11 has a closed end 13 and an open end 14 and a ring member 15 is affixed to the open end 14 of strainer member 11. Ring member 15 may be molded over open end 14, as shown in FIG. 4, or it could be affixed by an adhesive or snap ring. Alternatively, the ring member could be sewn to open end 14 and could be a simple wire ring. Preferably, however, ring member 15 is a polymer member which prevents any corrosion and securely holds the mesh from which the strainer member 11 is fabricated.

The use of lint strainer 10 is shown best in FIGS. 1 and 2 where a washing machine 16 is shown and has a rubber drain hose 17. Rubber drain hose 17 has an inverted U-shaped exit end 18. The exit opening is indicated by reference character 19. A generally vertical drain pipe 20 is attached to a fitting 21 which leads to the sewer system of the house. Drain pipe 20 is typically a metal, thin-walled pipe and has a flared opening indicated by reference character 22. Flared opening 22 has an inside diameter indicated by reference character "d" and the outside diameter of the ring member 15 of lint strainer 10 is indicated by reference character "D" shown in FIG. 3.

As shown in FIG. 2, lint strainer 10 is securely held in drain pipe 20 by ring member 15. In order to securely hold the strainer in drain pipe 20, the outside diameter "D" of the ring member 15 must be larger than the inside diameter "d" of drain pipe 20. Preferably, the inside diameter D, is also larger than the outside diameter d, of the flared opening 22. In this way, ring member 15 causes the upper end of the strainer member 11 to pass over flared opening 22. This facilitates the removal of the lint strainer 10 from the drain pipe 20 for cleaning.

It can be readily seen that lint particles indicated generally by reference character 23 are collected within strainer member 11. It is equally evident that lint strainer 10 can be easily cleaned by simply removing the inverted U-shaped exit end 18 from within strainer member 11 and pulling the strainer member out of the drain pipe 20. The strainer member may then be turned inside out and the lint easily removed. Even if a small amount of lint remains clinging to the strainer member 11, the strainer member can be inserted in a reverse direction into the opening 22 of drain pipe 20. The exit water from the washing machine will then cause this small amount of unremoved lint to pass into the drain system.

The strainer can be fabricated from a polymeric mesh but is preferably made from a fabric mesh because of its increased flexibility. The ring member 15 is preferably a polymeric ring member so that it may be securely molded about the open end 14 of the strainer member 11.

It can be seen that the lint strainer of the present invention is easily used but yet is durable and effective. It is easily cleaned and is free from any corrosion or deterioration. The strainer member may also hold a substantial amount of lint before becoming full.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An improved lint strainer for washing machines for preventing lint in the exit water stream of the washing machine from entering the drain line, said washing machine being of the type including a rubber drain hose having an inverted U-shaped exit end and said washing machine being mounted adjacent a generally vertical drain pipe having an interior wall and having a generally circular opening at the top thereof, said improvement comprising:
   a flexible, closed, tubular strainer member having a top and a bottom and a plurality of openings therethrough, said strainer member having an open end at the top thereof and being closed at the bottom, and the bottom of said strainer member being positioned within the interior wall of said vertical drain pipe; and
   a ring member having an inside diameter larger than the generally circular opening at the top of the generally vertical drain pipe, said ring member being affixed to said strainer member at the top thereof and said strainer member being held therein by contact with the strainer member adjacent the ring member.

2. The lint strainer of claim 1 wherein said strainer is a fabric mesh member.

3. The lint strainer of claim 2 wherein said ring member is a polymeric ring member.

4. The lint strainer of claim 3 wherein said ring member is molded about the top of the strainer member.

5. The lint strainer of claim 1 wherein the strainer has openings which would permit the passage of an object having a diameter of up to about 1/32 of an inch.

* * * * *